Figure 1:
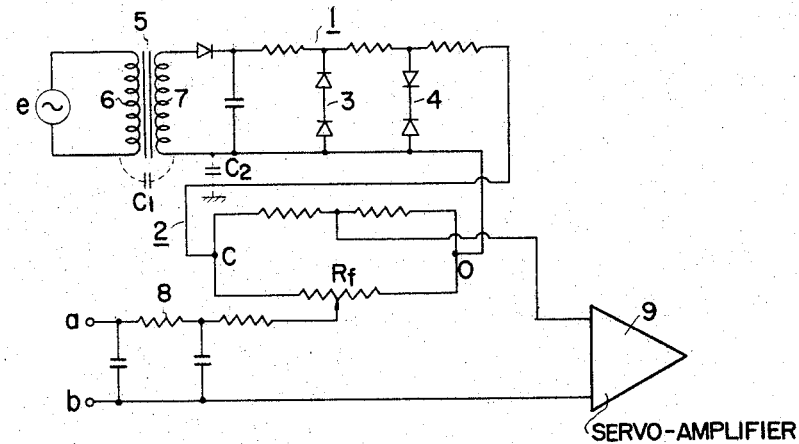

July 25, 1967  TOSHIO NUMAKURA ET AL  3,333,170

SELF-BALANCING INSTRUMENTS

Filed Feb. 25, 1964

INVENTORS
Toshio Numakura
Hiroshi Morozumi

BY Mestern & Mestern

United States Patent Office 3,333,170
Patented July 25, 1967

3,333,170
SELF-BALANCING INSTRUMENTS
Toshio Numakura, Kodaira-shi, and Hiroshi Morozumi, Toshima-ku, Tokyo-to, Japan, assignors to Kabushiki Kaisha Hitachi Seisakusho, Tokyo-to, Japan, a joint-stock company of Japan
Filed Feb. 25, 1964, Ser. No. 347,307
Claims priority, application Japan, Mar. 2, 1963 (utility model), 38/15,205
1 Claim. (Cl. 318—29)

This invention relates to self-balancing instruments including constant voltage source means. More specifically, the invention relates to a new constant-voltage source comprising an oscillator to produce oscillations at a frequency which is substantially higher than the break frequency of a servoamplifier of a self-balancing instrument. For example, according to the invention, undesirable components leaking out of the A.C. power source of the constant-voltage source for a potentiometer circuit in a recorder can be eliminated in a very simple manner from the servomechanism (for example, a servo-amplifier) of the said instrument.

In general, conventional constant-voltage sources wherein elements for constant voltage such as Zener diodes are utilized have heretofore been widely used as standard or reference voltage sources of potentiometer circuits used in recorders and other self-balancing instruments, as is well known. Such conventional constant-voltage sources have advantages such as easy maintenance and semipermanent life as compared with the case of source elements such as storage batteries. In this case, however, depending on the arrangement of the load circuit, the undesirable A.C. component leaks out of the A.C. power source of the constant power source mentioned, and this phenomenon tends to cause various problems. Particularly in the case of such a constant-voltage source used as the standard voltage source of a potentiometer circuit in a high-sensitivity recorder, many difficulties are encountered.

It is a general object of the present invention to overcome such difficulties which will be described more fully hereinafter.

Figure 2:
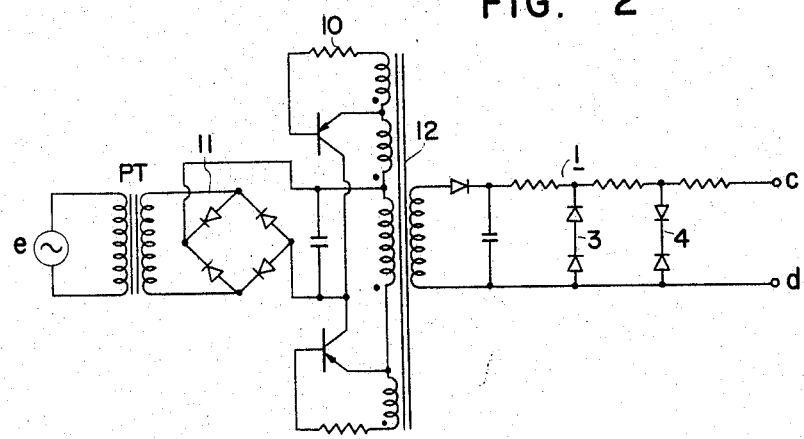

The nature, principle, and details of the invention will be best understood by reference to the following description, taken in conjunction with the accompanying drawing in which like parts are designated by like reference characters, and in which:

FIGURE 1 is a circuit diagram showing a part of the input circuit of self-balancing recorder of known circuit arrangement; and FIGURE 2 is a circuit diagram showing an application of a preferred embodiment of the constant-voltage source according to the present invention.

For a full understanding and appreciation of the nature and utility of the present invention, the following consideration of the difficulties encountered with respect to conventional constant-voltage sources of the instant type is believed to be desirable and prerequisite.

Referring first to FIGURE 1, in a recorder as shown having an input circuit composed essentially of a conventional constant-voltage source 1 comprising essentially Zener diodes 3 and 4 and a transformer 5, a potentiometer circuit 2, an input filter circuit 8, and a servo-amplifier 9, it is necessary, in general, that the recorder be operated with either of the input terminals $a$ and $b$ connected to ground (or earth). Under this operational condition, the result in an ordinary case is that, because of a leakage or stray capacitance $C_1$ between the primary winding 6 and the secondary winding 7 of the transformer 5 and a leakage capacitance $C_2$ between the secondary winding 7 and ground, the undesirable A.C. voltage component of an A.C. power supply $e$ of commercial frequency leaks out and applies to the potentiometer circuit 2, so that full balancing of that circuit cannot be attained. Therefore, an unbalanced voltage which increases with increasing capacitance values of the capacitances $C_1$ and $C_2$ is applied to the input terminals of the servoamplifier 9. For the above reason, depending on the magnitude of the unbalanced voltage, the output of the servo-amplifier becomes normally saturated, thereby giving rise to the possibility of substantial detriment to the performance of the recorder.

In the case when a conventional constant-voltage source is used in the above described manner, factors such as the magnitudes of the leakage capacitances of the transformer 5 inevitably become problematical and directly affect the performance of the recorder. Accordingly, it is apparent that, in the case wherein a constant-voltage source of this character is to be used, for example, as a standard voltage source of a potentiometer circuit for a high-sensitivity recorder, an appropriate remedial measure becomes mandatory.

As such a measure, the first to be thought of is that of reducing as much as feasible the said leakage capacitances of the transformer. For this purpose, however, it is necessary to resort to such expedients as providing the secondary winding 7 of the transformer with a double shield or providing a large winding space between the winding and its core. Such expedients necessarily cause the transformer 5 be of large size and high cost and are, therefore, not advantageous. Moreover, such expedients have limitations and cannot be expected to afford complete solutions to the aforementioned problems.

According to the present invention, the voltage of commercial frequency from the A.C. voltage source is not applied directly to the Zener circuit as above described but is first caused to excite an appropriately selected oscillator, the oscillation frequency of which is caused to be amply higher than the break frequency of the servo-amplifier (the upper limit frequency at which the amplifier gain is reduced by 3 db.). The voltage at this oscillation frequency is then rectified, and the power so rectified is applied to the Zener circuit.

That is, according to the invention, if an undesirable A.C. voltage of the oscillation frequency leaks out, and unbalanced voltage due to the A.C. voltage is applied to the servoamplifier, its frequency is determined substantially higher than the break frequency of the amplifier. Therefore, this voltage can be readily eliminated by using means such as a suitable by-pass circuit, and the aforementioned difficulties can be completely overcome.

In one embodiment of the invention as shown in FIGURE 2, there are provided Zener diodes 3 and 4, as described hereinabove, a Royer oscillator 10, a rectifier 11 for bias of the said oscillator 10, an output transformer 12 of the said oscillator 10, and output terminals $c$ and $d$ of the constant-voltage source so composed. These output terminals are connected to a circuit such as the aforementioned potentiometer circuit. Thus, by selecting the oscillation frequency of the said Royer oscillator to be amply high (of the order of a number of kc./sec.) as described above, a self-balancing instrument achieving the objects of the present invention is provided.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What is claimed is:

In a self-balancing servo system of the type in which the output from a balancing bridge is fed to a servo amplifier, said bridge being supplied by a D.C. voltage source; the improvement comprising; an oscillator for producing oscillations at a frequency substantially higher than the break frequency of said servoamplifier; means for rectifying the output of said oscillator and stabilizing said rectified output; and means for supplying said stabilized output to said bridge as said D.C. voltage source.

References Cited

UNITED STATES PATENTS

| | | | |
|---|---|---|---|
| 2,904,734 | 9/1959 | Paschkis | 324—100 |
| 3,184,673 | 5/1965 | Grillo | 321—10 X |
| 3,192,464 | 6/1965 | Johnson et al. | 321—2 |

JOHN F. COUCH, *Primary Examiner.*

W. H. BEHA, *Assistant Examiner.*